United States Patent [19]

Davis

[11] Patent Number: 4,577,434
[45] Date of Patent: Mar. 25, 1986

[54] FLYPAPER TRAP

[76] Inventor: Mitchell F. Davis, 1430 Hickory, Atwater, Ohio 44201

[21] Appl. No.: 712,845

[22] Filed: Mar. 18, 1985

Related U.S. Application Data

[63] Continuation-in-part of Ser. No. 620,818, Jun. 15, 1984, abandoned.

[51] Int. Cl.[4] .............................................. A01M 1/14
[52] U.S. Cl. ........................................ 43/115; 43/114
[58] Field of Search ................. 43/107, 108, 114, 115, 43/116, 117

[56] References Cited

U.S. PATENT DOCUMENTS

| 11,276 | 10/1892 | Thum | 43/114 |
| 414,606 | 11/1889 | Thum | 43/114 |
| 550,345 | 11/1895 | Humphreys et al. | 43/114 |
| 601,183 | 3/1898 | Thum | 43/114 |
| 662,603 | 11/1900 | Shaw | 43/116 |
| 663,728 | 12/1900 | Church | 43/114 |
| 1,031,889 | 7/1912 | Thieme | 43/116 |
| 1,655,128 | 1/1928 | Berghorn | 43/114 |
| 3,708,908 | 1/1973 | Levey | 43/114 |
| 4,411,093 | 10/1983 | Stout et al. | 43/114 |

FOREIGN PATENT DOCUMENTS

| 1125509 | 6/1982 | Canada | 43/114 |
| 177502 | 1/1906 | Fed. Rep. of Germany | 43/114 |
| 374805 | 3/1923 | Fed. Rep. of Germany | 43/116 |
| 11689 | of 1901 | United Kingdom | 43/114 |
| 1297 | of 1912 | United Kingdom | 43/116 |

Primary Examiner—Nicholas P. Godici
Assistant Examiner—M. Jordan
Attorney, Agent, or Firm—Michael Sand Co.

[57] ABSTRACT

A flypaper trap has a clear plastic outer canister formed with a plurality of staggered insect inlet holes. The ends of the canister are closed by two plastic end caps. A hanger is attached to the top end cap for supporting the trap from a structure. In one embodiment, a roll of flypaper material has a plurality of prismatic metal flakes secured to the viscous tackifier material of the flypaper and the roll is uncoiled and extends throughout the canister interior. In a second embodiment, a cardboard tube is wrapped with layers of flypaper having the same prismatic metal flakes thereon. The flypaper layers are separated by a release paper to prevent the viscous tackifier material or coating of adjacent layers from sticking together. The tube is inserted into bosses formed on the inside of the end caps for positioning it within the canister. Upon the exposed flypaper becoming loaded with dead insects, another section of the prismatic flake coated tackifier material is unwrapped from the tube to provide a clean refill for the trap. The prismatic metal flakes reflect various colors which attract insects into the canister where they become stuck on the tackifier material. Any dead insects which fall from the flypaper drop into the bottom end cap for subsequent disposal.

12 Claims, 7 Drawing Figures

U.S. Patent  Mar. 25, 1986  Sheet 1 of 2  4,577,434
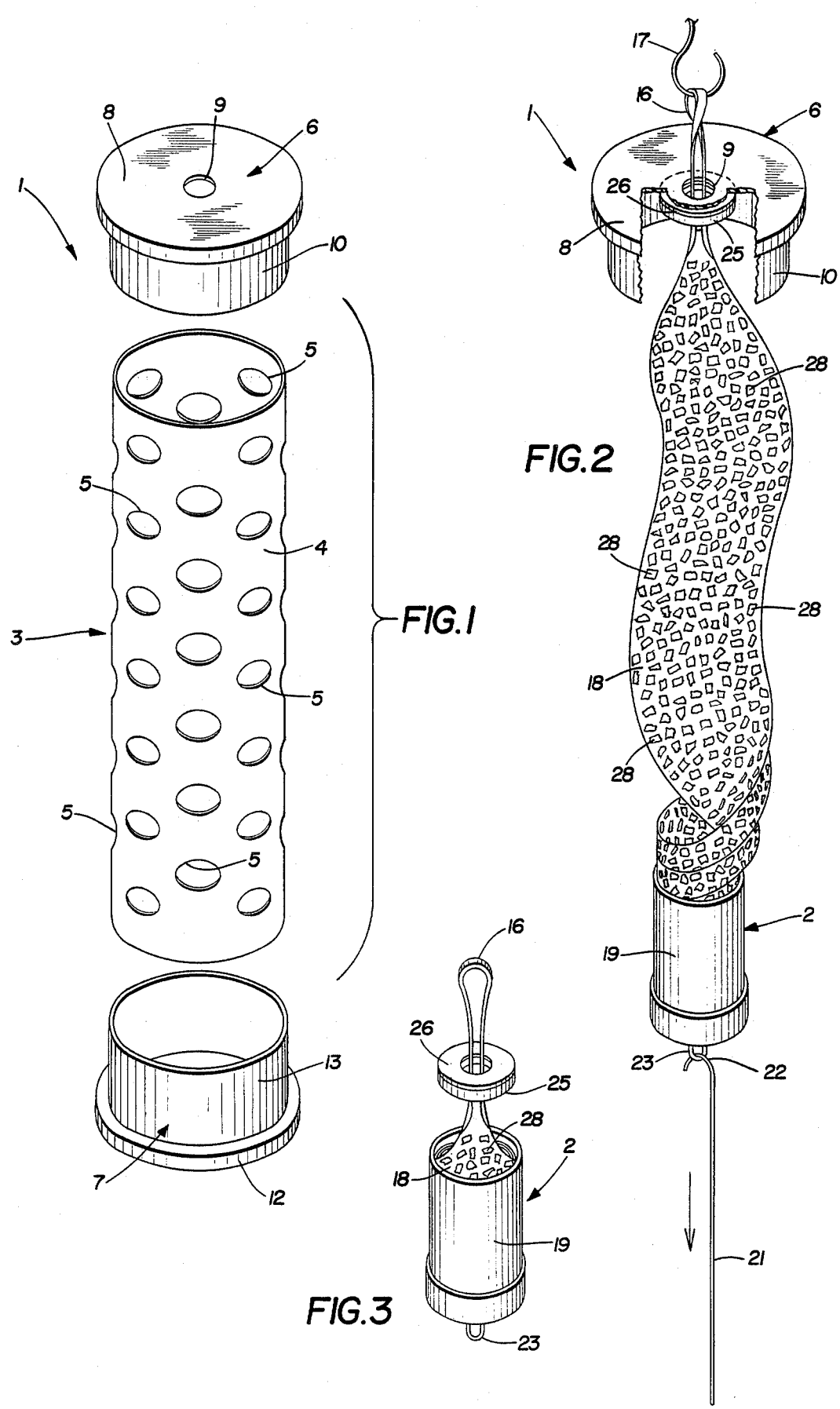

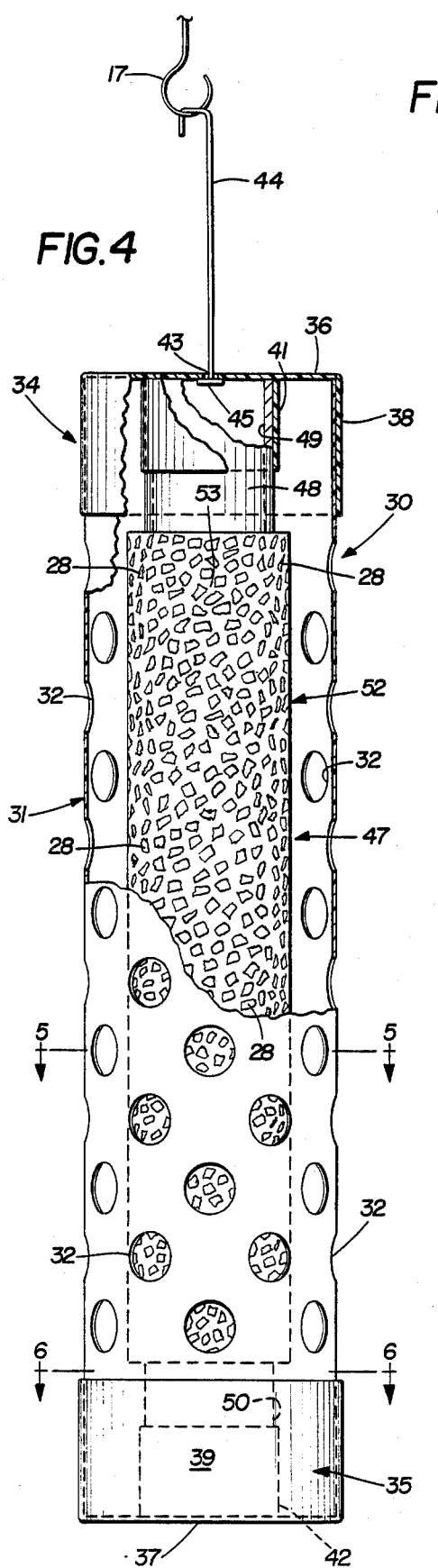
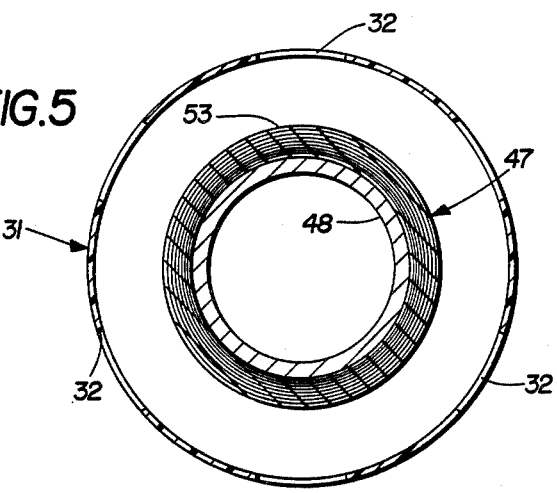
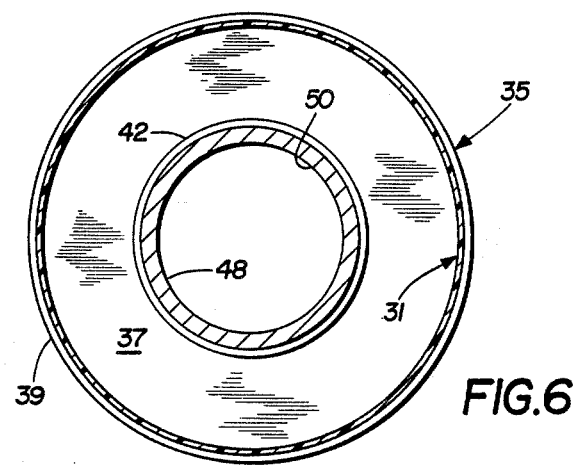
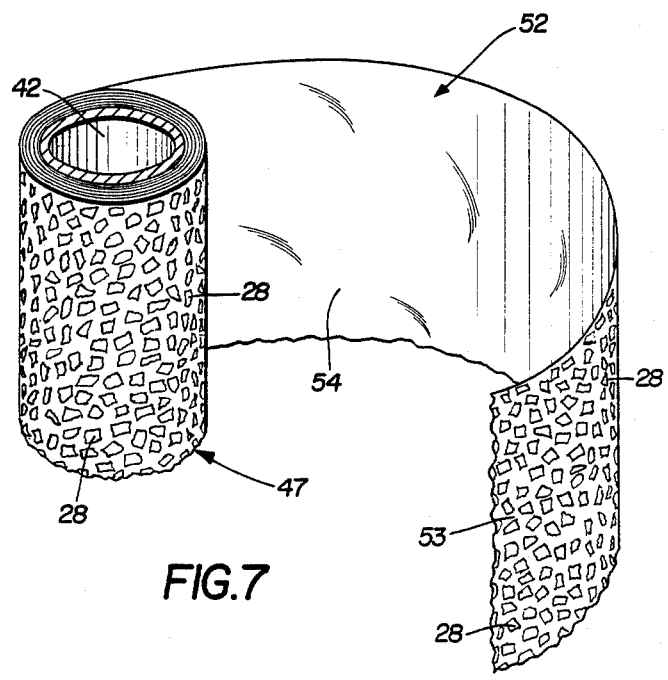

FLYPAPER TRAP

CROSS REFERENCE

The present application is a continuation-in-part of copending application Ser. No. 620,818, filed June 15, 1984, now abandoned.

TECHNICAL FIELD

The invention relates to insect traps and particularly to flypaper traps for catching flies and similar insects. More particularly, the invention relates to such a flypaper trap in which viscous tackifier material of the flypaper has a coating of prismatic metallic flakes to increase its attractiveness to the insects and in which the flypaper insert portion is refillable to provide an inexpensive yet highly effective trap.

BACKGROUND ART

Various types of insect traps have been devised for use in the home, barn, or commercial buildings for trapping and catching flying insects. Many of these prior traps use a viscous tackifier material which holds the insect to the material ultimately resulting in the insect's death. Some of these prior flypaper traps had a lure or other chemical associated with the trap to assist in drawing the insect against the tackifier strip. Other traps have used a light source to attract the insects into contact with the flypaper such as shown in U.S. Pat. No. 550,346.

Still other trap devices place the tackifier material within a container having a pluarlity of holes through which the insects fly to assist in retaining the insects in close proximity to the flypaper so that they would ultimately contact the paper and become adhered thereto. Examples of such flypaper traps are shown in German Pat. Nos. 177,502 and 374,805 and United Kingdom Pat. No. 11,689. Another known type of flypaper trap uses a coil of flypaper which is suspended from a supporting structure and extended downwardly to form a spiral like configuration, such as shown in U.S. Pat. Nos. 662,603; 882,735; and 1,031,889.

Although these prior flypaper traps work relatively satisfactory they have several disadvantages. Most of these prior flypaper traps are not reusable and have to be completely discarded upon becoming loaded with flies or surrounding dust and dirt particles. Also, dead insects or parts thereof over a period of time will drop from their stuck position on the flypaper and fall onto the surrounding surface. This unwanted dropping is very unsatisfactory and presents problems when used in a commercial establishment. Also, these totally exposed flypaper traps are a source of germs and contamination and are extremely messy to handle by the user. Furthermore, these prior traps do not provide the desired amount of attraction to bring the insect into contact with the tackifier material.

Another type of prior trap shown in U.S. Pat. No. 4,411,093 attempts to eliminate many of these problems by increasing the attraction to the insects by covering the device with a luminuous material with graphic silhouettes of flies thereon. A clear tackifier material then is applied over the silhouettes.

Thus, the need has existed for an improved flypaper trap which eliminates the problems discussed above with prior art traps and there is no known device which performs as satisfactory and as effectively as my flypaper trap disclosed below and set forth in the appended claims.

DISCLOSURE OF THE INVENTION

Objectives of the invention include providing an improved flypaper trap in which the tackifier material is housed within clear transparent outer housing or canister to provide a more attractive and sanitary device, which can be used in all living areas of the home, eating areas of restaurants and in food preparation areas, and in which the tackifier material can be replaced with fresh material upon becoming loaded with dead insects eliminating the heretofore need of discarding the entire trap thereby providing a more economical trap than prior known traps. Another objective is to provide such a trap in which the clear plastic canister is mounted between a pair of end caps which can be mass produced relatively inexpensively and in various colors enabling the trap to match the particular decor of the area in which it is to be installed thereby becoming less obtrusive by blending in with the surrounding color scheme.

A further objective of the invention is to provide such an improved flypaper trap in which a pheromone disc or similar chemical which provides a luring scent can be incorporated within the canister to increase its ability to attract insects into the canister and eventually into contact with the tackifier material, in which the clear plastic canister is formed with a plurality of holes arranged in a staggered relationship around the periphery thereof which will always present an opening at various horizontal levels to an insect encircling the canister thereby increasing the access into the interior, and in which the canister partially traps the insect increasing the likelihood of the insect contacting the tackifier material.

A further objective of the invention is to provide such an improved flypaper trap in which the viscous tackifier flypaper material is partially covered with a plurality of prismatic metal flakes which reflect a spectrum of colors which tests have indicated provide a greater attraction to insects, and in which the flypaper is removably mounted within the canister interior and may be in a coiled roll form which is attached at one end to an upper end cap of the canister and uncoiled throughout the canister interior. Another objective is to provide such a trap in which the prismatic flake covered tackifier material may be coated on a replaceable cardboard tube which is removably mounted within the canister, or in which layers of such viscous tackifier flake impregnated material is wrapped around the cardboard tube and separated by surfaces of release material to prevent the adjacent wraps of the material from coming into contact and sticking together to provide a refill cartridge enabling a sufficient amount of unexposed tackifier material to be unrolled from the tube upon the previously exposed material becoming loaded with dead insects enabling a numer of refills to be obtained from a single replacement insert cartridge.

Another objective of the invention is to provide such a trap in which the bottom end cap serves as a collector for the dead insects or parts thereof which may drop from the tackifier material after the insect has been dead for some period of time, which in combination with the exterior plastic canister prevents any such insects or parts thereof from falling from the trap and into the surrounding environment. A still further objective is to provide such an improved flypaper trap which is free of toxic fumes which prevents many types of flytraps from being used in certain environments where they are exposed to food or humans, in which the trap is highly attractive to the insects due to the use of the prismatic metal flakes and pheromone disc, and in which the flypaper is extremely inexpensive to produce yet is sturdy and durable, and in which only the tackifier flypaper material need be replaced periodically which can be accomplished in an extremely efficient, effective and sanitary manner, and in which the flypaper trap solves problems and satisfies needs existing in the art.

These objectives and advantages are obtained by the improved flypaper trap, the general nature of which may be stated as including a canister having a hollow interior and formed with a plurality of holes providing access into said interior; a pair of end caps mounted on opposite ends of the canister; flypaper having a coating of a viscous tackifier material mounted within the interior of the canister; and a plurality of flakes formed of reflective material adhered to the flypaper by the viscous coating to attach insects into the canister interior through the canister holes for capture of the insects by the viscous tackifier material.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

FIG. 1 is an exploded perspective view of the canister and end cap portions of the improved flypaper trap;

FIG. 2 is a perspective view with portions broken away and in section showing a roll of flypaper being suspended from a hanger at the top end cap and with the roll being uncoiled by an instrument at its lower end;

FIG. 3 is a perspective view of a flypaper insert filler prior to be uncoiled and suspended within the canister as shown diagrammatically in FIG. 2;

FIG. 4 is a side elevational view with portions broken away and in section, showing a modified form of the improved flypaper trap;

FIG. 5 is an enlarged sectional view taken on line 5—5, FIG. 4;

FIG. 6 is an enlarged section view taken on line 6—6, FIG. 4; and

FIG. 7 is a fragmentary perspective view showing a flypaper insect filler having a plurality of layers of strip material, one surface having a coating of flake impregnated viscous tackifier material and the other surface having a coating of release material shown in a partially unrolled condition and removed from within the canister.

Similar numerals refer to similar parts throughout the drawings.

BEST MODE FOR CARRYING OUT THE INVENTION

First Embodiment

A first embodiment of the improved flypaper trap is indicated generally at 1, and is shown particularly in FIGS. 1, 2 and 3. Flypaper trap 1 includes as its main components a flypaper insert filler 2 (FIG. 3), a canister 3 and a pair of end caps 6 and 7. Canister 3 preferably is formed of a cylindrical sheet 4 of plastic material. Sheet 4 preferably is transparent although it could be formed of opaque or translucent material. A plurality of holes 5 are arranged in staggered rows throughout the circumference of canister 3 and are formed sufficiently large to provide easy access for most insects into the canister interior.

Canister 3 provides a partial trap to retain the insects within the interior once they have entered through holes 5 a sufficient period of time whereby the insects become stuck against the viscous tackifier material described in greater detail below. Furthermore, canister 3 provides a shield to prevent accidental contact by humans or animals against the tackifier material mounted within the interior thereof. Canister 3 is removably mounted between upper and lower end caps 6 and 7 by a friction slip-fit engagement between the outer surface of canister 3 and the inner surface of the end caps. End cap 6 has a disc-shaped end wall 8 formed with a central hole 9 and has an outwardly projecting cylindrical side wall 10. Bottom end cap 7 includes a disc-shaped end wall 12 and a cylindrical side wall 13. End caps 6 and 7 are telescopically mounted about the exterior of the open ends of canister 3 for mounting the canister therebetween.

Insert filler 2 is a coil or roll of viscous tackifier material commonly referred to as a flypaper. Filler 2 is removably mounted within canister 3 by means of a hanging loop 16. Loop 16 projects through end cap hole 9 and is adapted to be engaged with a hook 17 for suspending flypaper trap 1 from a supporting structure. Insert filler 2 includes a strip of material 18 usually paper, which is coated with a viscous tackifier material which has adhesion properties to prevent the escape of an insect therefrom once the insect has contacted strip 18.

Strip 18 preferably is stored within a cylindrical casing 19 to prevent it from coming into contact with foreign materials and individuals during storage and shipment until ready for use within canister 3. Strip 18 can be uncoiled easily by use of a rod 21 having a hooked end 22 which is engaged with an eyelet 23 formed at the bottom of casing 19. A pheromone disc 25 which provides a sex lure scent or other insect attraction may be telescopically mounted about hanging loop 16 and is located within canister 3 when in assembled condition. An end seal washer 26 abuts against the inside surface of end cap wall 8 adjacent to pheromone disc 25 when strip 18 is suspended within canister 3.

Insert filler 2 is installed easily within canister 3 by slidably removing end caps 6 and 7 which have a frictional fit with the open ends of canister 3 after which hanging loop 16 is inserted through end cap hole 9 and rod 21 is engaged with canister eyelet 23. Canister 3 then is attached to end cap 6 and strip 18 uncoiled by pulling downwardly on rod 21. Bottom end cap 7 then is reattached to canister 3 with casing 19 remaining within the lower end of canister 3 preferably supported by end cap 7 after rod 21 is disengaged from eyelet 23.

In accordance with one of the main features of the invention, a plurality of prismatic flakes 28 are sprinkled on and are adhered to strip 18 by the tackifier material. Flakes 28 preferably are formed from diffraction embossed metalized polyester film and have a prismatic effect whereby a spectrum of colors is reflected from the flakes and against the inner surface of canister 3 or through canister holes 5 to attract insects into the canister. Either natural light or artifical light will be reflected by the flakes and will provide an effect which is pleasing to humans as well as insects which have been known to react to different colors. U.S. Pat. No. 3,653,145 shows a trap using a specific color whereas the prismatic flakes of my invention uses all spectral colors and will reflect metallic shades of high intensity through holes 5 or in softer color tones through the clear plastic of cansiter 3.

Studies have shown that many insects are susceptible to softer colors tones during certain barometric pressures than to a higher intensity tone in different barometric pressures. Thus, canister 3 provides a complete spectrum of colors in both soft and intense color tones to increase the attractiveness of the trap to insects regardless of the atmospheric conditions. The attractiveness of the reflective colors of flakes 28 in combination with pheromone disc 25 increases considerably the attractiveness level of improved flytrap 1. One type of reflective flakes 28 found suitable for use in flytrap 1 is distributed by Metalflake Company of Haverhill, Mass. under the trademark MIRRA. Other types of reflective metal or plastic diffraction embossed particles or films could be used although the metallic flakes similar to the specific type described above have been found to be most effective. Also, a strip of diffraction embossed metalized polyester film may be covered with a clear tackifier material and replace strip 18 and flakes 28.

Second Embodiment

A modified form of the improved flypaper trap is indicated generally at 30, and is shown particularly in FIGS. 4–7. Trap 30 is similar in many respect to trap 1. It includes a hollow cylindrical-shaped canister indicated generally at 31, formed with a plurality of staggered holes 32. Canister 31 preferably is mounted formed of a transparent plastic material and is mounted between upper and lower end caps, indicated generally at 34 and 35, respectively, which are similar to end caps 6 and 7. End caps 34 and 35 preferably are molded inexpensively of plastic material and have disc-shaped end walls 36 and 37 formed integrally with cylindrical side walls 38 and 39.

Cylindrical-shaped bosses 41 and 42 are molded integrally on the inner surface of end walls 36 and 37, respectively, and project inwardly within the respective cylindrical side walls 38 and 39 of the end caps. The outer diameter of canister 31 is complementary with the inside diameter of end cap side walls 38 and 39 to provide a sliding frictional engagement therewith as are end caps 6 and 7 with canister 3 of trap 1. A central hole 43 is formed in end cap wall 36 through which a mounting strap 44 extends for engagement with supporting hook 17. The lower end of strap 44 may have an enlarged flange or washer 45 to retain strap 44 within end cap 44.

In accordance with one of the main features of modified trap 30, a flypaper insert filler tube indicated generally at 47, is removably mounted within canister 31. Flypaper insert 47 includes a central cardboard tube 48 having an outer diameter complementary to the inner diameter of end cap bosses 41 and 42 so as to be slidably telescopically mounted within the end cap bosses for mounting insert 47 within canister 3 as shown in FIG. 4.

If desired, the outer surfaces of cardboard tube 48 could be coated with the viscous tackifier material which is partially covered or sprinkled with prismatic flakes 28 to form a replacement or filler insert tube removably mounted within the canister. With this arrangement, such tackifier coated cardboard tubes can provide a disposable insert which after becoming loaded with dead insects can be removed easily from within the canister and disposed of with a new tackifier coated cardboard tube being inserted in the canister by its engagement with end cap bosses 41 and 42.

However, another and a preferred construction of flypaper insert 47 is shown in the drawings and particularly in FIG. 7. In this arrangement, cardboard tube 48, except for exposed ends 49 and 50 which are adapted to be inserted into the end cap bosses, is wrapped with a plurality of layers of a length of strip material 52 having an outer surface 53 covered with the viscous tackifier material and having an inner surface 54 coated with a release material such as silicone. Strip 52 is formed of paper or fabric and has the viscous tackifier material coating on one side thereof and the release coating on the opposite side. The release coating preferably is silicone and prevents the firm adherence of the tackifier material thereto. This release coating is commonly referred to as Kraft paper although other type of release surfaces than the usual Silicone coating can be used without affecting the concept of the invention. Outer surface 53 of strip 52 will be partially covered with prismatic flakes 28 as is strip 18 of embodiment 1.

With this arrangement, wrapped tube 18 is removably mounted within canister 31 by end caps 34 and 35 and functions in the same manner as canister 1. Upon exposed tackifier surface 53 of strip 52 becoming loaded with dead insects and surrounding contaminates, flypaper insert 47 is easily removed from within the canister and a predetermined amount or approximately one revolution of strip 52 is unwound from tube 48. The insect loaded expoxed material then is removed from the remainder of strip 52 to provide a completely fresh and uncontaminated outer tackifier surface 53 when the tube is reinstalled within the canister.

A considerable number of wraps or convolutions of tackifier strip 52 can be mounted on cardboard tube 48 to provide a plurality of refills by flypaper insert 47 instead of a single refill which would be provided by the embodiment of flypaper trap 1 or by coating only the exterior surface of cardboard tube 48 with the tackifier material as described above. Again, prismatic flakes 28 provide for the greatly increased attraction of the insects into the canister. Also, a pheromone disc (not shown) may be telescopically mounted on the unwrapped end 49 of cardboard tube 48 if desired, to increase even further the attractiveness of flypaper insert 47 to insects.

SUMMARY

Tests have shown that prismatic flakes 28 increase considerably the attractiveness of the trap to insects. Two strips of flypaper were hung in an active house with both strips being of the same brand, length and height from the floor and located about six inches from each other and placed the same distance from doors, windows and an artificial light source. Only one test strip was coated with prismatic flakes 28. Insect activity was normal in the house and a window was open for 12 hours to get sufficient specimens into the house.

During the first night, the artificial lighting was left on for a total of approximately 11 hours with no insects being caught on either strip. However, after eight hours of natural light, the strip sprinkled with the prismatic flakes had captured 15 flies and 3 gnats whereas the similar strip without the prismatic flakes had captured only 6 flies and 4 gnats. After a total passage of 24 hours, the prismatic flake coated strip had captured 19 flies and 3 gnats and the uncoated strip had captured only 8 flies and 4 gnats.

A similar test was repeated with entirely two fresh strips of prismatic flake coated and uncoated flypaper in a different room. The same relationship was maintained between the strips and to the surroundings as in the environment of the first test but in a separate room. No artificial light was used during the darkness hours. After a period of 24 hours, the prismatic flake treated strip had caught 40 flies and 10 gnats and the uncoated test strip caught 12 flies and 6 gnats. Repeated test results showed from 3 to 4 times as many insects were caught on strips treated with the prismatic flakes in contrast to the untreated strips.

Improved flypaper traps 1 and 30 provide a device which is extremely inexpensive to produce and assemble requiring as its main components a clear plastic cylinder which can be formed of readily available plastic sheet material cut into predetermined lengths and rolled into the cylindrical configurations with a plurality of preferably staggered holes being punched into the sheet material before it is rolled into the cylindrical shape. The end caps are molded inexpensively of plastic and can be molded in various colors to provide a trap which can be matched to the surrounding decor of the room in which it is placed thereby being less obtrusive than prior flypaper traps. Furthermore, bottom end caps 7 and 36 provide a collector for the dead insects and parts thereof which after a period of time drop from the tackified material. This prevents them from falling into the room as in prior flypaper traps.

The enclosure of the tackifier material within the canister prevents unwanted contact with surrounding fixtures, humans or animals which reduces the spread of germs. Also, the replacement of the insert filler is convenient and accomplished with a minimum of contact with the flypaper material. Likewise, the prismatic flakes increase considerably the attractiveness of the trap to the insects due to the various colors and shades of light reflected therefrom which tests have shown have different effects on insects depending upon the barometic pressures and weather conditions. Also, both high intensity and softer shades of color reflection is achieved through the material of the plastic container and through the insect access openings formed therein. If desired, the canister could be formed of a translucent material having a smoked or other type of reflective inner surface which could further diffuse the light reflected from the diffraction embossed prismatic flakes or film to achieve different light characteristics.

Accordingly, the improved flypaper trap provides an extremely inexpensive, durable, sanitary and attractive device which can be used in a variety of environments for attracting and catching insects without exposing the inhabitants to toxic fumes from the trap, and in which the flypaper insert filler is replaceable requiring only the inserts to be purchased for continued use of the traps.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved flypaper trap is constructed and used, the characteristics of the construction, and the advantageous, new and useful results obtained; the new and useful structures, devices, elements, arrangements, parts, and combinations, are set forth in the appended claims.

What is claimed is:

1. A flypaper trap including:
(a) a canister having a hollow interior and formed with a plurality of holes providing access into said interior;
(b) a pair of end caps mounted on opposite ends of the canister; and
(c) flypaper including a coating of a viscous tackifier material and a metalized prismatic material mounted within the interior of the canister, with said prismatic reflective material attracting insects into the canister interior through the canister holes for capture of the insects by the viscous tackifier material.

2. The flypaper trap defined in claim 1 in which the canister is a transparent cylinder and the holes are formed in a staggered relationship about the circumference of the cylinder.

3. The flypaper trap defined in claim 1 in which hanging means is engaged with one of the end caps for hanging the canister from a supporting structure.

4. The flypaper trap defined in claim 3 in which the flypaper is an uncoiled strip of material one end of which is connected to the hanging means.

5. The flypaper trap defined in claim 1 in which the canister is cylindrical having open ends; in which the end caps include a disc-shaped end wall and a cylindrical side wall projecting from said end wall; and in which the ends of the canister are telescopically slidably mounted within a respective cylindrical side wall of the end caps for mounting the end caps on the canister.

6. The flypaper trap defined in claim 5 in which a hole is formed in an end wall of one of the end caps; and in which hanging means is attracted to an end of the flypaper and extends through the hole formed in said end cap wall to suspend the canister from a supporting structure.

7. The flypaper trap defined in claim 1 in which the reflective prismatic material is a plurality of metal flakes.

8. The flypaper trap defined in claim 1 in which the reflective prismatic material is a strip of diffraction embossed metalized polyester film.

9. The flypaper trap defined in claim 1 in which the flypaper is in roll form and includes an inner supporting tube and a strip of material wrapped into a plurality of convolutions about the tube with one side of said material strip being coated with the viscous tackifier material and the other side of the strip having a carrier release coating separating the tackifier material of adjacent convolutions to provide a plurality of refills by removing an outer insect loaded portion of the strip and unwrapping another fresh layer of the strip from the wrapped tube.

10. The flypaper trap defined in claim 9 in which the support tube is cylindrical and terminates in a pair of ends which project beyond the strip of material wrapped about the tube; in which each of the end caps includes an annular boss which projects inwardly toward the interior of the canister; and in which the ends of the tube are telescopically inserted into the annular bosses to mount the tube and wrapped strip within the canister.

11. The flypaper trap defined in claim 7 in which the canister is cylindrical having a pair of open ends; in which the end caps are cylindrical each having an open and a closed end; and in which the canister is removably telescopically slidably mounted within the open ends of the end caps.

12. The flypaper trap defined in claim 11 in which the canister is formed of transparent plastic material; and in which the holes are formed in a staggered relationship about the canister.

* * * * *